INVENTOR
PETER J. FREY
BY Fishman & Van Kirk
ATTORNEYS

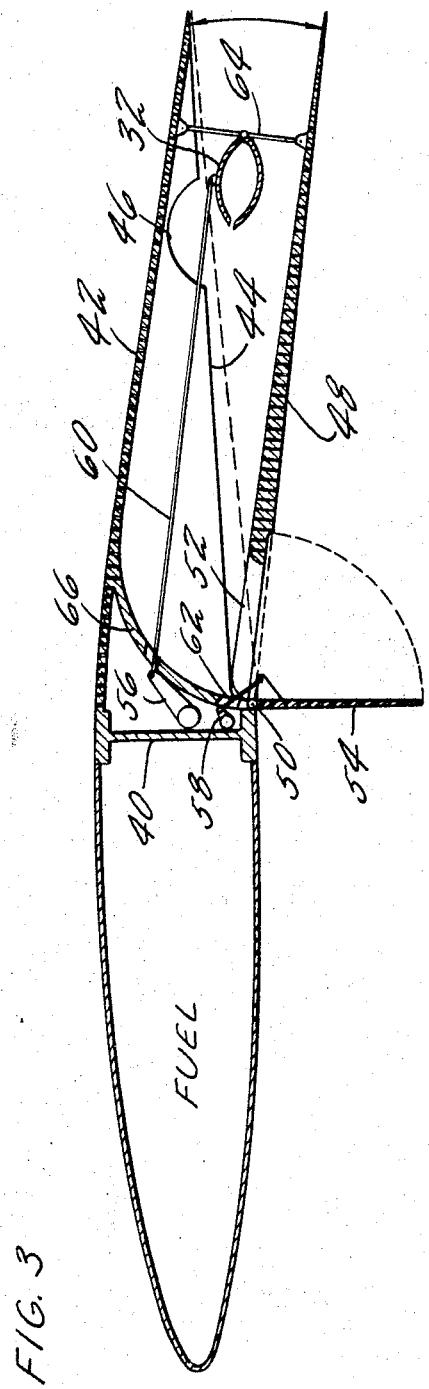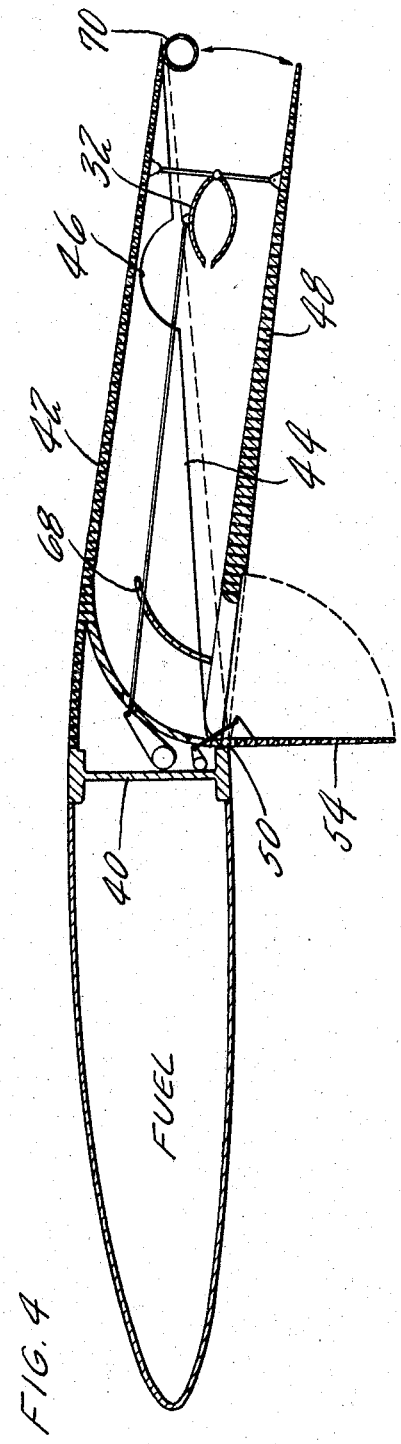

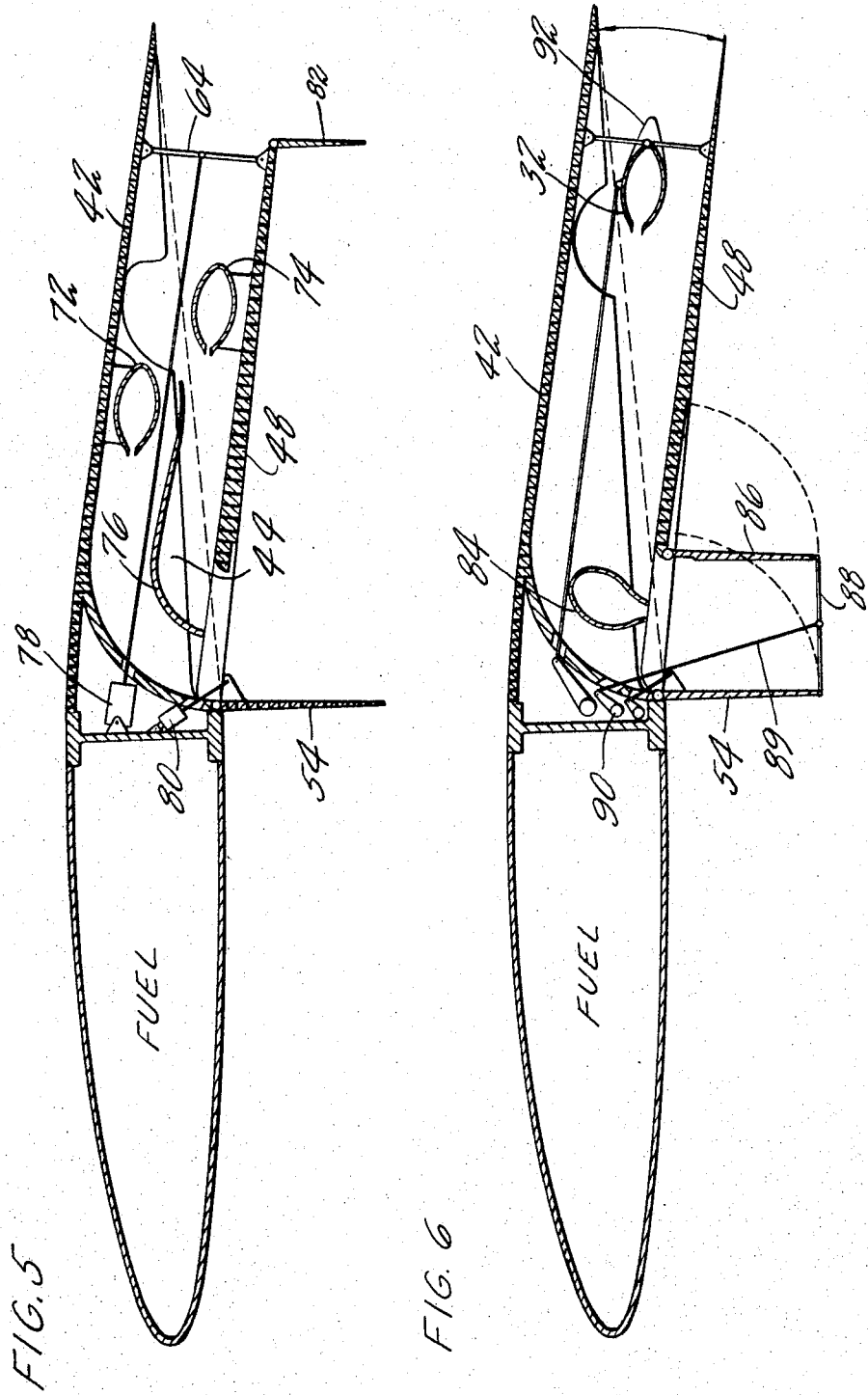

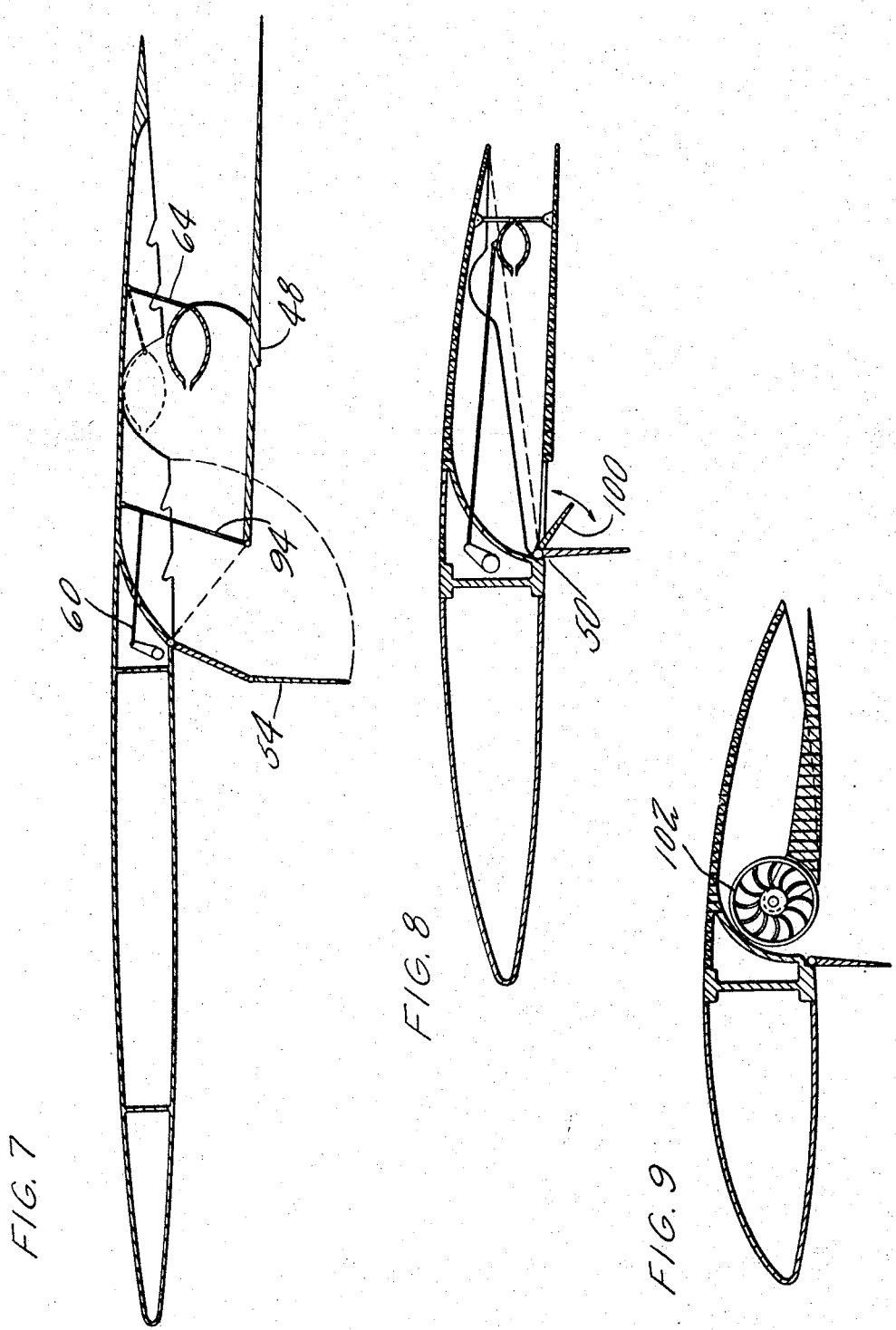

United States Patent Office 3,454,239
Patented July 8, 1969

3,454,239
COUNTERFLOW JET FLAP
Peter J. Frey, 30 Woodland St.,
Hartford, Conn. 06105
Filed Apr. 5, 1967, Ser. No. 628,673
Int. Cl. B64c 23/00
U.S. Cl. 244—42                                    20 Claims

ABSTRACT OF THE DISCLOSURE

Lift augmentation apparatus for aircraft including movable lower airfoil panels which define chord-wise ducts within oppositely disposed wings. Suction is created within the chordwise ducts and air is drawn in at the trailing edge of the wings and ejected through an opening in the lower side of the airfoils. Roll control is achieved by modulating the suction created in the chord-wise ducts and/or by choking and/or spoiling the flow ejected from the airfoils. Drag control is achieved through selective positioning of the generally downwardly extending doors which cover the exit openings in the lower sides of the airfoils during normal cruising conditions.

BACKGROUND OF THE INVENTION

Field of the invention

The present invention relates to the augmentation of the lift provided by an airfoil. More particularly, the present invention is directed to the providing of aircraft with increased lift without the creation of additional pitch moments and to the simultaneous providing of a roll and a drag control for aircraft. Accordingly, the general objects of the present invention are to provide new and improved methods and apparatus of such character.

Description of the prior art

While not limited thereto in its utility, the present invention is particularly well suited for use on aircraft which are designed for operating from air strips of limited length and/or surface quality. Accordingly, the present invention will be described in relation to such aircraft, better known as STOL's. In the prior art, various methods have been proposed, and in some cases actually implemented, for increasing the lift of an airfoil. Some of these prior art methods, such as the well known boundary layer control systems, have met with limited success. A boundary layer control system, which involves the suction or blowing of air over flaps to increase lift, while effective, can provide only relatively small lift augmentation. One of the limiting factors in the amount of additional lift that a boundary layer control can provide resides in the fact that it has little effect on the Kutta-Joukowski air flow condition at the trailing edge of an airfoil. In addition to the "Kutta" condition at the trailing edge, the lift coefficient of an airfoil is also limited by the fact that stagnation points occur at both the leading and trailing edges. It has long been known that lift could theoretically be enhanced by moving the stagnation points from the leading and trailing edges toward a common point beneath the airfoil. While a boundary layer control system may tend to secure attached flow and thereby shift the trailing edge stagnation point downwardly, it cannot shift both stagnation points toward a common point located beneath the foil. Thus, as a further disadvantage of the prior art lift augmentation schemes, the securing of attached flow as, for example, by means of a boundary layer control which blows air over a flap, will create a strong nose down pitch moment due to predominantly shifting the trailing edge stagnation point downwardly. Another serious disadvantage of the prior art boundary layer control systems resides in the fact the usable airfoil volume is severely limited as the quantity of blown air increases.

A "jet curtain" system has also been proposed to enhance lift and thus provide an improvement over the boundary layer control systems. A "jet curtain" system is disclosed in U.S. Patent No. 3,149,805, issued Sept. 22, 1964, jointly to the present inventor and Fred G. Wagner. The present invention comprises an improvement over the system disclosed in U.S. Patent No. 3,149,805. The areas in which improvement may be found include enhanced structural integrity of airfoils including the system, increased power efficiency of the system, elimination of a fire hazard inherent in the prior art system which burned fuel adjacent to the wing tanks and incorporation of roll and a drag control into the system.

SUMMARY OF THE INVENTION

The present invention overcomes the above discussed disadvantages of prior lift augmentation schemes. In so doing, the present invention encompasses means for defining a chord-wise duct along the span (full or part) of an airfoil through which air is sucked from the vicinity of the trailing edge and blown in a downwardly direction through the lower side of the airfoil. Suction is created by means of a jet pump effect, the source for the entraining fluid ejected from the jet pumps preferably being the propulsive means of the vehicle on which the airfoil is mounted. A movable wing panel is employed to define the aforementioned chord-wise duct and the means for causing movement of the panel to the open position to define the duct is located rearwardly of the jet pump means and, when locked in the open position, will prevent collapsing of the airfoil due to underpressure in the duct. The movable wing panel and the doors which cover the exit end of the chord-wise duct in the lower surface of the airfoil are pivoted about the same axis which is preferably located adjacent to the median chord point of the airfoil and affixed to or supported from the main spar in the airfoil. The upper airfoil portion, which defines the upper side of the chord-wise duct and the movable wing panels are preferably of sandwich-type construction and the upper airfoil portion is supported by chord-wise ribs. The span-wise jet pump means, which is located within the chord-wise duct, is tapered from the inboard to the outboard ends of the airfoil in approximate proportion to the tapering of the airfoil itself. The fluid supply to the jet pump is, in the case of a multi-engine aircraft, from a plenum chamber which is supplied by fluid generated or bled from all the engines. Control means are provided to modulate the pressure delivered to the jet pumps in the oppositely disposed airfoils to thereby provide for roll control and lift modulation. Alternately, roll control may be achieved by selective choking or spoiling (deflecting) of the counter-flowing jet which exits from the chord-wise wing ducts. Control means are provided to differentially deflect the doors which cover the exit end of the chord-wise duct on each oppositely disposed airfoil, thereby effectively reducing the total thrust recovery of the blowing jet and otherwise increasing the induced and parasite drag without decreasing the total lift of the vehicle, thereby facilitating steep landing approaches.

DESCRIPTION OF THE DRAWING

The foregoing and numerous additional novel features and advantages of the present invention will become apparent to those skilled in the art by reference to the accompanying drawing wherein like reference numerals refer to like elements in the various figures and which:

FIGURE 3 is a cross-sectional view of a first embodiment of the lift augmentation system of the present invention installed in an airfoil.

FIGURE 4 is a cross-sectional view of a second embodiment of the lift augmentation system of the present invention installed in an airfoil.

FIGURE 5 is a cross-sectional view of a third embodiment of the lift augmentation system of the present invention installed in an airfoil.

FIGURE 6 is a cross-sectional view of a fourth embodiment of the lift augmentation system of the present invention installed in an airfoil, the apparatus of FIGURE 6 including a roll control means.

FIGURE 7 is a cross-sectional view of the lift augmentation system of the present invention as it might be installed in a supersonic airfoil.

FIGURE 8 is a cross-sectional view of a second embodiment of a roll control in accordance with the present invention.

FIGURE 9 is a cross-sectional view of a fifth embodiment of the lift augmentation system of the present invention installed in an airfoil.

DESCRIPTION OF THE PREFERRED EMBODIMENTS

Figure 1:
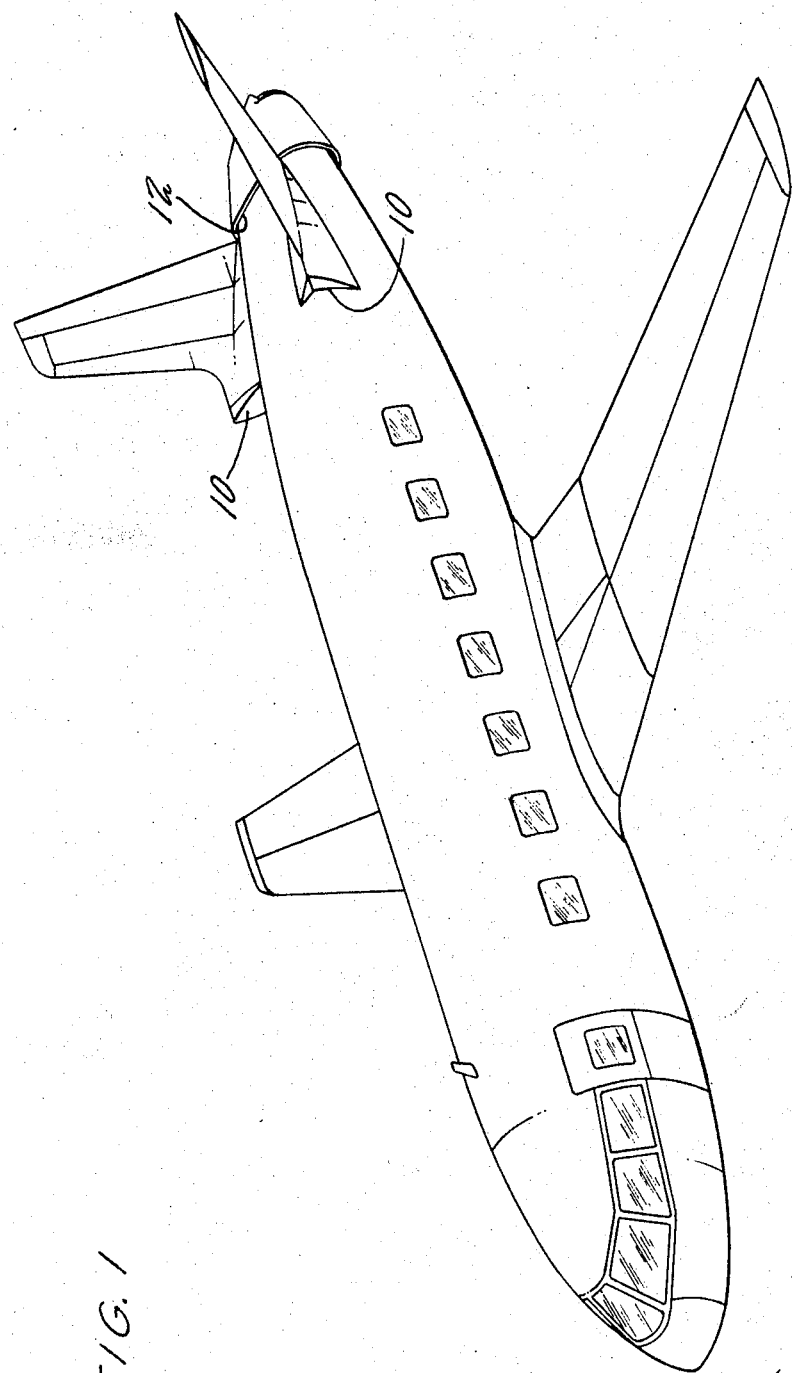
FIGURE 1 depicts an STOL twin engine jet transport type aircraft embodying the present invention.

Referring now to FIGURE 1, an STOL jet transport aircraft is shown. In order to make an aircraft of the type shown in FIGURE 1 operationally superior, when compared to prior art propeller driven aircraft of the same capacity, cruise efficiency has to be substantially increased while maintaining the ability to operate from relatively short air strips. Thus, the aircraft must have relatively short take-off and landing distances while simultaneously having high cruising speed and easy maneuverability. In the past, STOL characteristics have generally been considered to be inconsistent with high cruise speed. The reason for this, of course, is that high cruising speeds, on the order of 500 to 600 m.p.h., dictates a wing airfoil shape and size which provides relatively little lift at take-off and landing speeds. The principal object of the present invention is to provide means which, during take-offs and landings, will greatly increase the lift of a high speed airfoil while not adversely affecting the ability to operate at high cruising speeds.

The aircraft depicted in FIGURE 1 employs a pair of aft-mounted turbofan type engines. The engine air intakes are indicated at 10—10 while the fan air intakes are at 12. The engines are shown schematically at 14 and 16 in FIGURE 2. However, engine and fan air intakes can be common.

Figure 2:
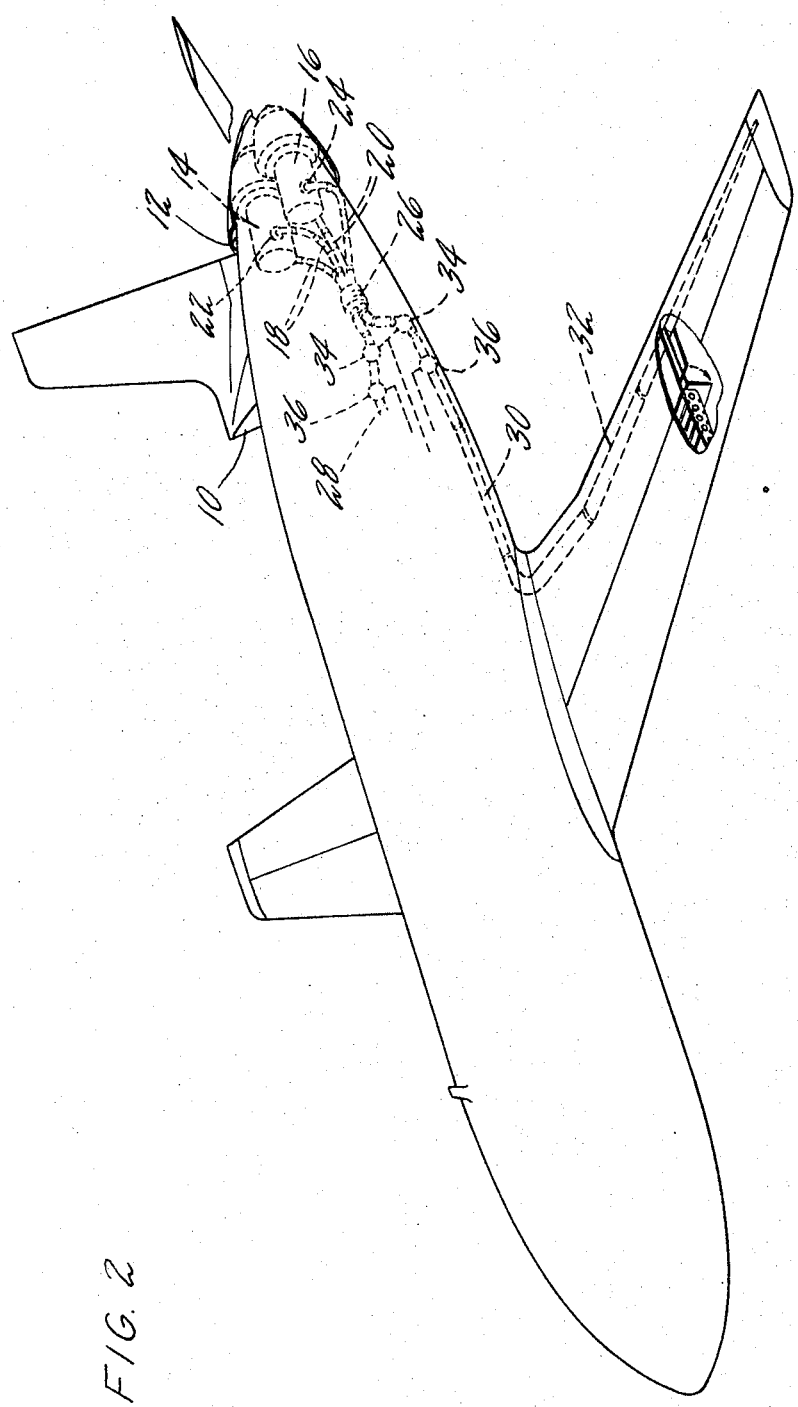
FIGURE 2 is a partial, schematic diagram of the aircraft of FIGURE 1 depicting a roll control in accordance with the present invention.

Fluid for powering the counterflow jet flap of the present invention is, in the preferred embodiment shown in FIGURE 2, bleed air from the compressor sections of engines 14 and 16. The compressor bleed air is drawn from engine 14 via conduits 18—18 and from engine 16 via conduits 20—20. Upstream, in the direction of compressor bleed air flow, are positioned compressor bleed valves; only two of which are shown at 22 and 24 respectively on engines 14 and 16. Automatic means such as one-way valves are provided to close the compressor bleed valves in case of an engine shutdown. Conduits 18 and 20 supply compressor bleed air to a plenum chamber 26. Air from plenum chamber 26 is delivered to jet pump means in the opposite wings of the aircraft. As shown in FIGURE 2, conduit 28 delivers air to the starboard wing jet pump, not shown, while conduit 30 delivers air from plenum chamber 26 to the jet pump means, indicated generally at 32, in the port wing.

Immediately downstream of plenum chamber 26 and disposed in conduits 28 and 30 are two pair of control valves 34—34 and 36—36. The purpose of these control valves is to provide for roll control and lift modulation. Compressor bleed valves 22 and 24 comprise two position valves which may be operated to either an open or closed condition from the aircraft flight deck. With compressor bleed valves 22 and 24 in the open position, a pressure $P_0$ will be established in plenum chamber 26. As indicated above, this pressure will be maintained even under the condition where one engine would fail since the compressor bleed valves associated with the failed engine would be automatically closed.

Control valves 34—34 will typically be two position valves which are controlled from a switch or other suitable means on the flight deck. In a first position, valves 34—34 will establish a first pressure reference, $P_1$, in the jet pump ducts. In the second position, valves 34—34 will establish a second pressure reference, $P_2$, in the jet pump ducts. Pressure level $P_1$ will be greater than pressure level $P_2$ and these two reference pressures will respectively be commensurate with the optimum jet pump pressure for landings and take-offs.

Control valves 36—36 operate together but in opposite directions to modulate the jet pump pressures to provide a differential between the oppositely disposed wings. To this end, valves 36—36 are operatively connected to the aileron control on the aircraft and provide a pressure modulation of plus or minus $\Delta P$ such that the jet pump pressures vary about the landing and take-off reference pressures $P_1$ and $P_2$ established by valves 34—34. Thus, control valves 36—36, by establishing a pressure differential in the jet pumps disposed within the oppositely disposed wings of the aircraft, automatically provide for roll control during take-off and landing.

It is to be noted that, while two pair of valves 34—34 and 36—36 have been shown as one method of achieving roll control and lift modulation, it would be within the capabilities of one skilled in the art to employ a single valve in each of conduits 28 and 30. Actuating mechanisms for setting valves or mechanical linkages to a neutral point and thereafter modulating the position of the device about such point are well known in the art and could be employed to position such a single valve.

Still referring to FIGURE 2, it may be seen that the jet pump means 32 extends span-wise of the wing of the aircraft and tapers from the inboard to the outboard extremities of the wing. In a preferred embodiment, the taper is such that the wing width and jet pump width maintain approximately the same proportion. As may also be seen from FIGURE 2, the forward position of the airfoil, that is the wing portion forward of the main spar, is of conventional construction and will usually contain the fuel tanks for the aircraft. The structure of the airfoil section to the rear of the main spar may be better seen from the consideration of FIGURES 3–9.

Referring now to FIGURE 3, an airfoil such as one of the wings of the aircraft shown in FIGURES 1 and 2 is shown in cross-section. The portion of the airfoil to the rear of a main spar 40 is, under normal cruising conditions, of conventional, high speed shape. However, this rear portion of the airfoil is of unconventional construction in that it is comprised of upper and lower panels, the lower panel being movable from a closed to an open position to define a chord-wise duct or passage for air which extends between the trailing edge of the airfoil and a downwardly directed opening located just rearwardly of the main spar 40. The upper surface defining portion 42 of the airfoil located to the rear of the main spar 40 is supported from spar 40 by a plurality of ribs such as rib 44. Rib 44 has a cut-out 46, the purpose of which will be explained below. In view of the minimum support afforded for upper airfoil section 42, section 42 must be of extremely strong construction. Accordingly, section 42 of the airfoil is fabricated of a sandwich-type material and the section and ribs are cantilevered, main spar 40 serving as the support for section 42.

The bottom surface of the airfoil between the trailing edge and main spar 40 is defined in part by a movable panel 48. Panel 48 is preferably also of sandwich-type construction and hinged about an axle 50. For maximum strength, axle 50 is also supported from main spar 40. Connection between the forward end of panel 48 and axle 50 is by means of a plurality of forwardly extending rib members such as member 52. Under normal flight conditions, the lower surface of the airfoil to the rear of main spar 40 presents an unbroken surface. However, when lift augmentation is desired, panels 48 and associated span-wise doors such as door 54 are opened to provide a downwardly directed exit for air passing through the airfoil. Door 54 is, like movable panel 48, hinged on axle 50.

Panels 48 and doors 54 are respectively operated by levers 56 and 58 and their associated control rods 60 and 62. Levers 56 and 58 are controlled by the pilot and may be driven by the same electric motor. However, it may be desired to exercise separate control over the movement of panel 48 and the opening of doors 54. In a preferred embodiment, each wing will have three separate panels 48 with associated doors 54 and at least the outboard panel will be movable independently of the other panels.

In order to achieve drag control, doors 54 are, in a preferred embodiment, capable of being staggered. Under take-off conditions, maximum thrust augmentation is desired and thus the doors associated with each movable wing panel will typically be fully extended as shown in FIGURE 3. However, in order to facilitate steep landing approaches, increased induced and parasite drag without reduced lift is desired and thus the position of doors 54 is staggered to reduce the total thrust recovery of the system. This staggering may be achieved by the operation of all the doors 54 to the open position by means of levers 58 and control rods 62 and thereafter partially closing alternate doors by means of a neutral point positioning device connected between the doors. In this manner, the doors or split flaps, as they are sometimes known, have a take-off position wherein all the doors are aligned and a landing position wherein the doors are staggered through the partial closing of selected doors.

As noted above, the wing panels and exit passage doors are operated by means of control rods 60 and 62. Operation by means of a control rod is particularly necessary in the case of the wing panels 48 which may be locked only in either the open or closed position. In a preferred embodiment, movement of each of the lower wing panels 48 is achieved by causing control rods 60 to operate collapsible scissors mechanisms such as mechanism 64. The collapsible scissors mechanisms are affixed at their opposite ends to the movable wing panels 48 and to cantilevered upper airfoil section 42. There will be at least a pair of scissors mechanisms on each of movable panels 48, the scissors mechanisms being located adjacent each end of each of the movable panels and in the aft half of the panels. Scissors mechanisms are the preferred panel actuating means since they may be locked in the open and closed position and, when locked in the open position, the scissors mechanisms provide necessary structural integrity such that under-pressure in the chord-wise wing ducts defined by the panels 48 will not result in collapsing or closure of the ducts. It is to be particularly noted that the scissors mechanisms are positioned rearwardly of the jet pump means, shown in cross-section at 32, through which compressor bleed air is injected into the chord-wise wing ducts. In the embodiment of FIGURE 3, the jet pump means 32 is physically mounted from the scissors mechanism 64 and, upon unlocking and closing of the panels 48, the jet pump means will be stored in aforementioned openings 46 in ribs 44.

The design and operation of jet pumps, such as jet pump 32 of the present invention, is well known in the art. Suffice it to say that compressor bleed air delivered to the jet pump duct is ejected into the chord-wise wing duct defined by movable panel 48 and cantilevered upper wing section 42. The air ejected from the jet pump means 32 is directed forwardly or in the direction of flight of the aircraft. The thus ejected compressor bleed air, in the manner well known in the art, generates a low pressure inside the chord-wise wing duct and adjacent the trailing edge of the airfoil. The creation of low pressure within the airfoil produces a suction which displaces downwardly the rearward stagnation point normally located adjacent the trailing edge. The fluid expelled from the jet pump entrains air drawn into the chord-wise wing duct by this suction and causes it to travel forwardly within the airfoil. The jet pump means is designed to operate in a choked flow condition. As previously noted, and as may be seen from FIGURE 2, the jet pump duct is tapered from its inboard to its outboard ends in approximate proportion to the taper of the air foil.

Fluid traveling through the chord-wise ducts exits from the duct through the opening defined by the doors 54. The exiting fluid is directed downwardly by door 54 and by a member 66 which defines the forward end of the chord-wise duct. The effect of this downwardly flowing fluid is to move the forward stagnation point from the leading edge of the airfoil downwardly and rearwardly thus increasing the lift coefficient of the airfoil.

Referring now to FIGURE 4, a second embodiment of the present invention is shown in cross-section. The embodiment of FIGURE 4 differs from that of FIGURE 3 in two respects. Firstly, a turning vane 68 has been incorporated in the duct defined by the movable wing panels and upper wing section. Turning vane or vanes 68 extend between ribs 44 and provide for increased turning efficiency through the prevention of separation in the chord-wise wing ducts.

The embodiment of FIGURE 4 also differs from that of FIGURE 3 in that an inflatable rubber boot 70 is affixed to the trailing edge of upper wing section 42. Boot 70 is automatically inflated by means not shown when panels 48 are moved to the open position. Boot 70 turns the attached flow, secured by the trailing edge suction, around the trailing edge of the airfoil. Accordingly, boot 70 assists in moving the trailing edge stagnation point downwardly and thus enhances the lift coefficient of the airfoil.

It is to be noted that, as in the embodiment of FIGURE 3, the movable wing panels 48 and doors 54 are attached to and movable about a single axle 50 which is located at or adjacent to the median cord point of the wing.

Referring now to FIGURE 5, a third embodiment of the present invention is shown. The embodiment of FIGURE 5 may be distinguished from the two previously described embodiments in that it employs a pair of jet pump means 72 and 74. Jet pump means 72 is suspended from upper wing section 42 while jet pump means 74 is mounted upon movable lower wing panels 48. In order to accommodate jet pump means 74 when the movable panels 48 are in the closed position, the ribs 44 are cut out, as in the previously described embodiments, and the ribs also terminate short of their point of termination in the other embodiments.

The embodiment of FIGURE 5 is also characterized by a turning vane 76 of more sophisticated design than turning vane 68 of the embodiment of FIGURE 4. Turning vane 76 extends rearwardly to a point adjacent the exit of jet pump means 74 and thereby directs the flow induced by jet pump means 72 and 74 into separate channels.

It is to be noted that, in the embodiment of FIGURE 5, hydraulic actuators 78 and 80 respectively for scissors mechanisms 64 and door 54 are employed rather than the mechanical actuators of the embodiments of FIGURES 3 and 4. Also, rather than employ an inflatable boot to aid in securing attached flow at the trailing edge, as in the embodiment of FIGURE 4, the apparatus of FIGURE 5 employs a movable flap 82. Flap 82, which is actuated by means not shown, comprises the trailing edge portion of movable panel 48.

Considering now the embodiment of FIGURE 6, the apparatus shown employs first and second jet pump means 32 and 84. Jet pump means 84 has its exit directed downwardly and directly into the opening defined by movable door 54. The support means for jet pump means 84 comprises a turning vane for flow induced in the chord-wise wing duct by jet pump means 32. The action of jet pump means 84 is to impart a boost to the fluid flowing through the chord-wise wing duct thereby increasing its exit velocity. The increase in velocity of fluid leaving the chord-wise wing duct through the opening defined by door 54 boosts the lift augmentation provided by the present invention.

To further increase the velocity of the fluid exiting from the wing duct, a second movable door 86 may also be provided; door 86 being hinged about the leading edge of movable panel 48. The other ends of doors 54 and 86 are interconnected by means of foldable linkage 88. Opening of door 54 causes the opening of door 86 to the position shown in FIGURE 6. Thereafter, by means of a control rod 89 and separate actuating means 90, the end of door 86 may be urged toward door 54 thus choking the flow exiting from the wing duct. By separately controlling doors 86 on port and starboard sides of an aircraft, roll control may be effected; the side with the choked flow having a lower lift coefficient.

It is also worthy of note that the end of jet pump means 32 which faces the trailing edge of the airfoil is provided with an airfoil shaped structure 92. Structure 92, due to its shape, decreases turbulence in the span-wise wing duct and thus increases the suction efficiency of the device.

FIGURE 7 depicts the embodiment of the present invention as it might be employed in an air-foil of supersonic design. The major distinguishing characteristics of the embodiment of FIGURE 7 is that the scissors mechanism 64 is not directly actuated by the control rod 60. Rather, rod 60 works through a rigid linkage 94 which is attached at opposite ends to the upper wing section and adjacent the leading edge of the movable panel.

Also worthy of note is the fact that the door 54, in the supersonic embodiment, is of increased length as opposed to the doors normally employed in subsonic configurations and, in its closed position, door 54 lies in a depression provided therefor on the outside of movable panel 48.

The embodiment of FIGURE 8 adds a further feature to the previously described embodiments. In FIGURE 8, a separately controllable spoiler member 100 is incorporated. Spoiler member 100 is hinged about axle 50 and may be used to direct the flow exiting from the span-wise wing duct thus providing additional control of the apparatus. In practice, spoiler members 100 will be associated only with the outboard doors 54 on each wing and will be used for roll control.

Considering the embodiment of FIGURE 9, the jet pump means of the previous embodiments has been eliminated in favor of the blower mechanism 102. Thus, as demonstrated by the embodiment of FIGURE 9, other means in place of or in addition to jet pump means may be used to induce flow through the chord-wise wing duct in accordance with the present invention.

As previously noted, one of the major features of the present invention is the incorporation of roll control means. A first and preferred embodiment of such roll control means is shown in FIGURE 2. Employing the apparatus of FIGURE 2, roll control may be effected by directing unequal volumes of fluid to the jet pump means in the oppositely disposed wings of an aircraft. The total life will of course, remain the same since the same volume of fluid will be ejected from the wing ducts. However, as shown in FIGURES 6 and 8, roll control may also be effected by selectively choking or spoiling (deflecting) the flow at the exit of span-wise wing ducts in the oppositely disposed wings. In the usual instance, the spoiler flap 100 of the embodiment of FIGURE 8 and/or the separately controllable door 86 of the embodiment of FIGURE 6 will be located only on the outboard movable wing panels. As should be obvious to those skilled in the art, roll control may be achieved by either or any combination of the three systems described above. Roll control and drag control may also be achieved by selectively controlling the doors 54 on each wing.

In operation, regardless of which embodiment of the present invention an aircraft is equipped with, when lift augmentation is desired the pilot will actuate the necessary controls to unlock the movable wing panels, move the wing panels from the closed to open position and relock the panels in the open position. Simultaneously, the doors 54 will be moved to the open position. Also simultaneously, the bleed control valves will be opened and compressor bleed air will be delivered to the jet pump means in the airfoils. The delivery of compressor bleed air to the jet pump means will result in suction at the trailing edge of the wings and downwardly directed flow just rearwardly of the center of the airfoils. This suction and downwardly directed flow will have the effect of moving the stagnation points from the leading and trailing edges of the wing downwardly and toward one another. Attached flow is thus secured about the trailing edge of the airfoil, and if the aircraft is equipped with means such as boot 70 of FIGURE 4 or flap 82 of FIGURE 5, the turning of air around the trailing edge may be facilitated by actuating such means.

While preferred embodiments of the present invention have been shown and described, various modifications and substitutions may be made thereto without departing from the spirit and scope of this invention. Accordingly, it is to be understood that the present invention has been described by way of illustration and not limitation.

What is claimed is:

1. In an aircraft having high cruising speed and short landing and take-off capabilities, a lift augmentation system comprising:

movable panels in the oppositely disposed wing airfoils of the aircraft, said movable panels extending forward from the trailing edges of the airfoils and in part defining the lower surfaces of the airfoils, said panels being movable from a closed to an open position and defining the lower interior surface of chord-wise ducts in the airfoils when in the open position, the upper interior surface of the chord-wise ducts being defined by the members which also define the upper surface of the airfoils, said ducts communicating with the trailing edges of the airfoils and having downwardly directed exit openings adjacent the forward ends of the panels;

actuating means for said movable panels, said actuating means extending between the upper sides of said panels and the upper interior surfaces of said ducts, said actuating means being lockable in an open or closed position;

span-wise jet pump means disposed within said chord-wise ducts, said jet pump means ejecting fluid into ducts in a forward direction whereby suction will be created adjacent the trailing edges and air will be induced to flow through said ducts;

means for delivering fluid under pressure to said jet pump means, said delivery means comprising conduit means communicating between said jet pump means and the propulsive means for the aircraft, said propulsive means supplying fluid under pressure for said jet pump means; and roll control means incorporated in said lift augmentation system, said roll control means comprising means for differently effecting the air exiting from the chord-wise ducts in the oppositely disposed wing airfoils.

2. The apparatus of claim 1 wherein each of the oppositely disposed wing airfoils of the aircraft has a main spar and said lift augmentation system further comprises:
hinge means mounted from the main spar in each of said airfoils; and
means mounting said movable panels for rotation about said hinge means when operated by said actuating means.

3. The apparatus of claim 2 further comprising:
door means for closing the exit ends of said chord-wise ducts dusing cruising conditions, said door means being mounted for rotation about said hinge means; and
means for operating said door means between the open and closed positions.

4. The apparatus of claim 1 further comprising:
turning vane means disposed in each of said chord-wise ducts.

5. The apparatus of claim 3 further comprising:
turning vane means disposed in each of said chord-wise ducts.

6. The apparatus of claim 1 wherein said actuating means comprise:
at least a pair of self-locking scissors mechanisms connected to each movable panel.

7. The apparatus of claim 3 wherein said actuating means comprise:
at least a pair of self-locking scissors mechanisms connected to each movable panel.

8. The apparatus of claim 7 wherein said jet pump means are positioned rearwardly of the midpoint of said movable panels and said scissors mechanisms are positioned rearwardly of said jet pump means.

9. The apparatus of claim 1 wherein the wing airfoils of the aircraft taper from their inboard to outboard ends and wherein said jet pump means further comprises:
duct means extending span-wise of the wing airfoils, said duct means having a forwardly directed opening and being designed to operate in a choked flow condition, said jet pump duct means tapering from their inboard to outboard ends in approximate proportion to the taper of the wing airfoils.

10. The apparatus of claim 8 wherein the wing airfoils of the aircraft taper from their inboard to outboard ends and wherein said jet pump means further comprises:
duct means extending span-wise of the wing airfoils, said duct means having a forwardly directed opening and being designed to operate in a choked flow condition, said jet pump duct means tapering from their inboard to outboard ends in approximate proportion to the taper of the wing airfoils.

11. The apparatus of claim 2 wherein the upper surface defining portion of the oppositely disposed wing airfoils to the rear of the main spar are of sandwich type construction and are mounted from said main spar and supported by stiffener ribs.

12. The apparatus of claim 1 wherein said means for differently effecting the air exiting from the chord-wise ducts in the oppositely disposed wing airfoils comprises:
means interposed in said delivery means for modulating the fluid delivered to the oppositely disposed jet pump means.

13. The apparatus of claim 3 wherein said means for differently effecting the air exiting from the chord-wise ducts in the oppositely disposed wing airfoils comprises:
means interposed in said delivery means for modulating the fluid delivered to the oppositely disposed jet pump means.

14. The apparatus of claim 10 wherein said means for differently effecting the air exiting from the chord-wise ducts in the oppositely disposed wing airfoils comprises:
means interposed in said delivery means for modulating the fluid delivered to the oppositely disposed jet pump means.

15. The apparatus of claim 1 wherein said means for differently effecting the air exiting from the chord-wise ducts in the oppositely disposed wing airfoils comprises:
means for selectively choking the flow exiting from at least a portion of one of the oppositely disposed chord-wise ducts.

16. The apparatus of claim 10 wherein said means for differently effecting the air exiting from the chord-wise ducts in the oppositely disposed wing airfoils comprises:
means for selectively choking the flow exiting from at least a portion of one of the oppositely disposed chord-wise ducts.

17. The apparatus of claim 1 wherein said means for differently effecting the air exiting from the chord-wise ducts in the oppositely disposed wing airfoils comprises:
means positioned in the exit openings of the chord-wise ducts for selectively spoiling at least a portion of the flow exiting from said ducts.

18. The apparatus of claim 10 wherein said means for differently effecting the air exiting from the chord-wise ducts in the oppositely disposed wing airfoils comprises:
means positioning in the exit openings of the chord-wise ducts for selectively spoiling at least a portion of the flow exiting from said ducts.

19. The apparatus of claim 1 wherein said aircraft is powered by a plurality of gas turbine engines and wherein said means for delivering fluid to said jet pump means comprises:
means for bleeding compressor air from each of the engines;
plenum chamber means communicating with each of said compressor bleed means; and
a pair of conduits extending from said plenum chamber means to respective of the jet pump means.

20. The apparatus of claim 19 wherein said roll control means comprises:
valve means positioned in each of said conduit means downstream of said plenum chamber for modulating the flow of compressor bleed air to said jet pump means.

References Cited

UNITED STATES PATENTS

| | | | |
|---|---|---|---|
| 3,085,740 | 4/1963 | Wagner | 244—42 X |
| 1,854,444 | 4/1932 | Barnhart. | |
| 1,971,592 | 8/1934 | Zaparka. | |
| 2,836,267 | 5/1958 | Reinhold | 244—123 X |
| 2,961,195 | 11/1960 | Bates. | |
| 3,291,420 | 12/1966 | Laing. | |

MILTON BUCHLER, *Primary Examiner.*

J. L. FORMAN, *Assistant Examiner.*